United States Patent [19]

Westerfield

[11] 4,373,456

[45] Feb. 15, 1983

[54] AGRICULTURAL FURROW FORMING APPARATUS DEPTH CONTROL

[75] Inventor: Lawerence D. Westerfield, Romeoville, Ill.

[73] Assignee: International Harvester Co., Chicago, Ill.

[21] Appl. No.: 265,514

[22] Filed: May 20, 1981

[51] Int. Cl.³ .............................................. A01C 5/06
[52] U.S. Cl. ..................................... 111/88; 172/425; 172/427; 172/430; 172/536
[58] Field of Search ............................ 111/85, 87, 88; 116/DIG. 3, 323, 324, 334; 73/1 J; 172/425, 427, 430, 536, 605, 764, 738

[56] References Cited

U.S. PATENT DOCUMENTS

| | | | |
|---|---|---|---|
| 1,308,574 | 7/1919 | Brady | 116/334 |
| 4,009,668 | 3/1977 | Brass et al. | 111/85 |
| 4,275,670 | 6/1981 | Dreyer | 111/87 X |

FOREIGN PATENT DOCUMENTS

| | | | |
|---|---|---|---|
| 500615 | 3/1954 | Canada | 172/430 |
| 2415421 | 8/1979 | France | 111/88 |
| 738539 | 6/1980 | U.S.S.R. | 111/88 |

OTHER PUBLICATIONS (anon) *7000 Max-Emerge Drawn Planters*, John Deere Parts Catalog, pub. by John Deere Plow & Planter Works PC-1467, pp. 10-3, 110-6 and 110-7.

*Primary Examiner*—James R. Feyrer
*Attorney, Agent, or Firm*—F. David Aubuchon

[57] ABSTRACT

An apparatus to be towed that includes frame supported, rotatably mounted furrow forming disks that are arranged to substantially contact each other at the approximate point of entry into the soil and diverge apart rearwardly and upwardly, a pair of rotatable gauge wheels having supports that individually and pivotally connect the wheels to the frame with each wheel being located generally adjacent an outer surface of a disk, a gauge wheel adjustment assembly, including an indicator, movably mounted in the frame for contact with the supports to achieve desired furrow depth, furrow depth indicating means having a zero indicating position and spaced indicia located adjacent the indicator and including adjustment structure to locate and fix the zero position opposite the indicator when the wheels and disks contact a level surface for accurate furrow depth control.

1 Claim, 7 Drawing Figures

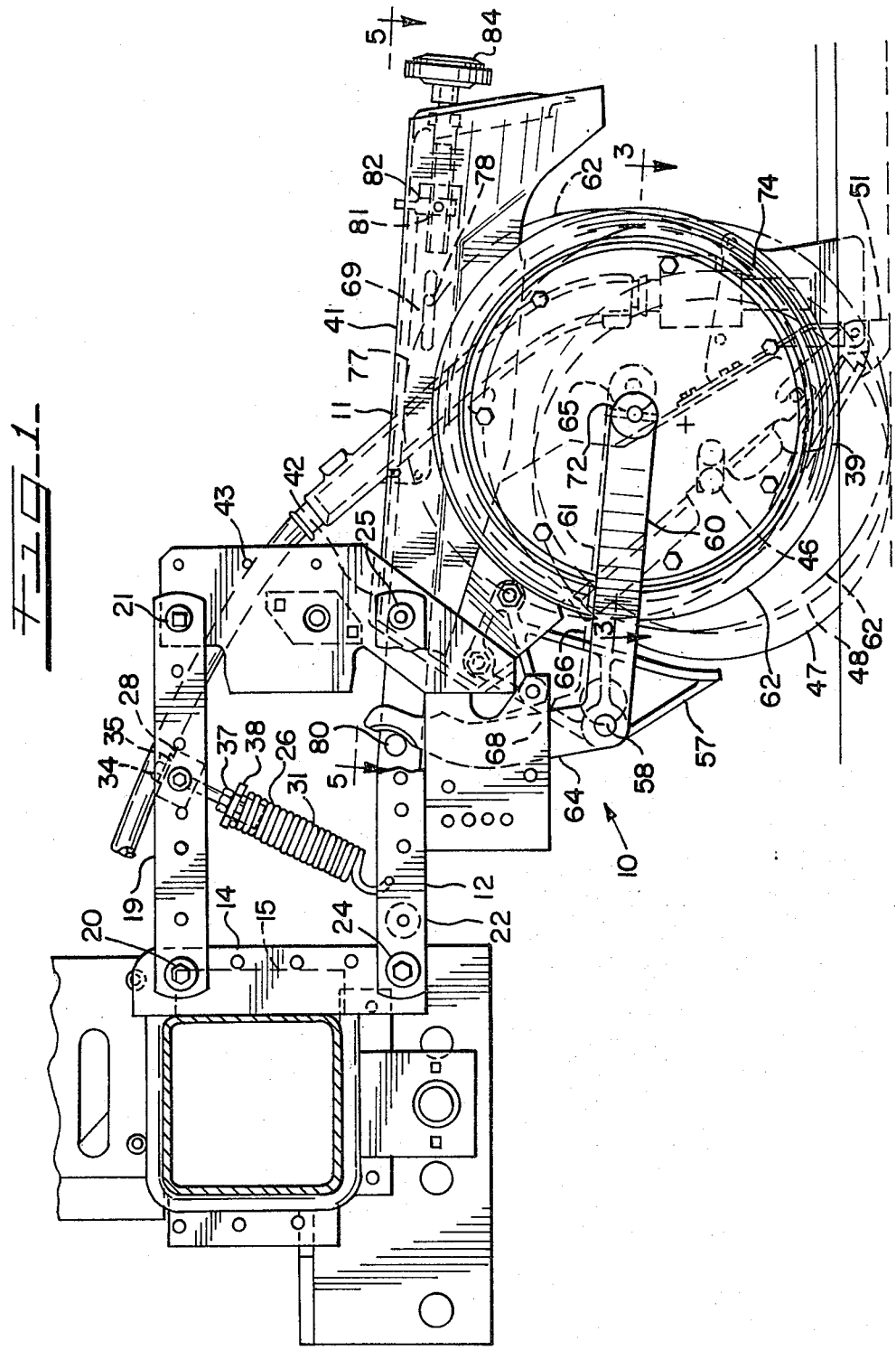

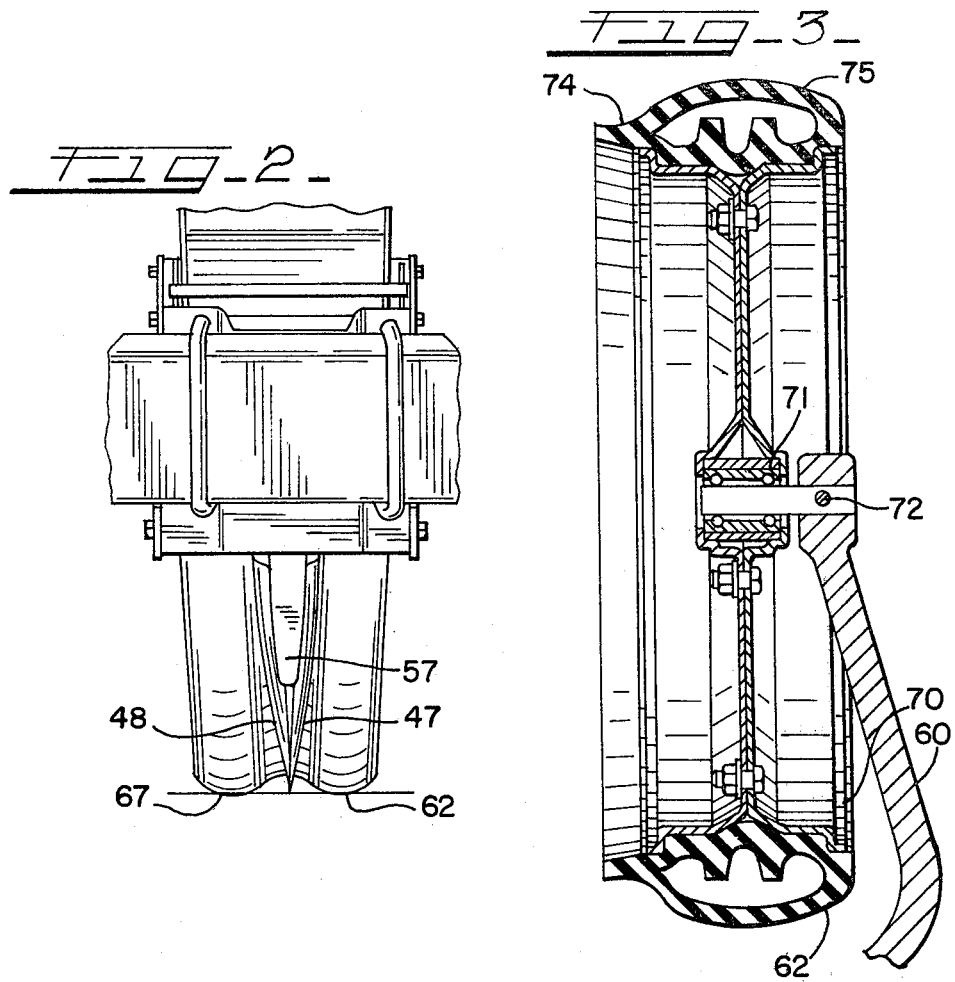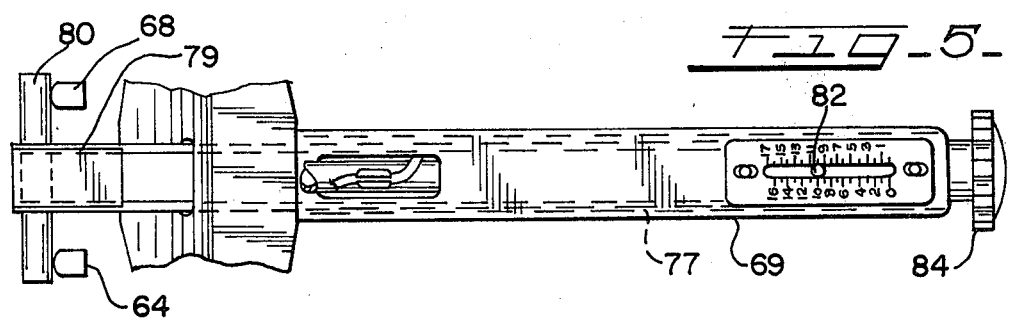

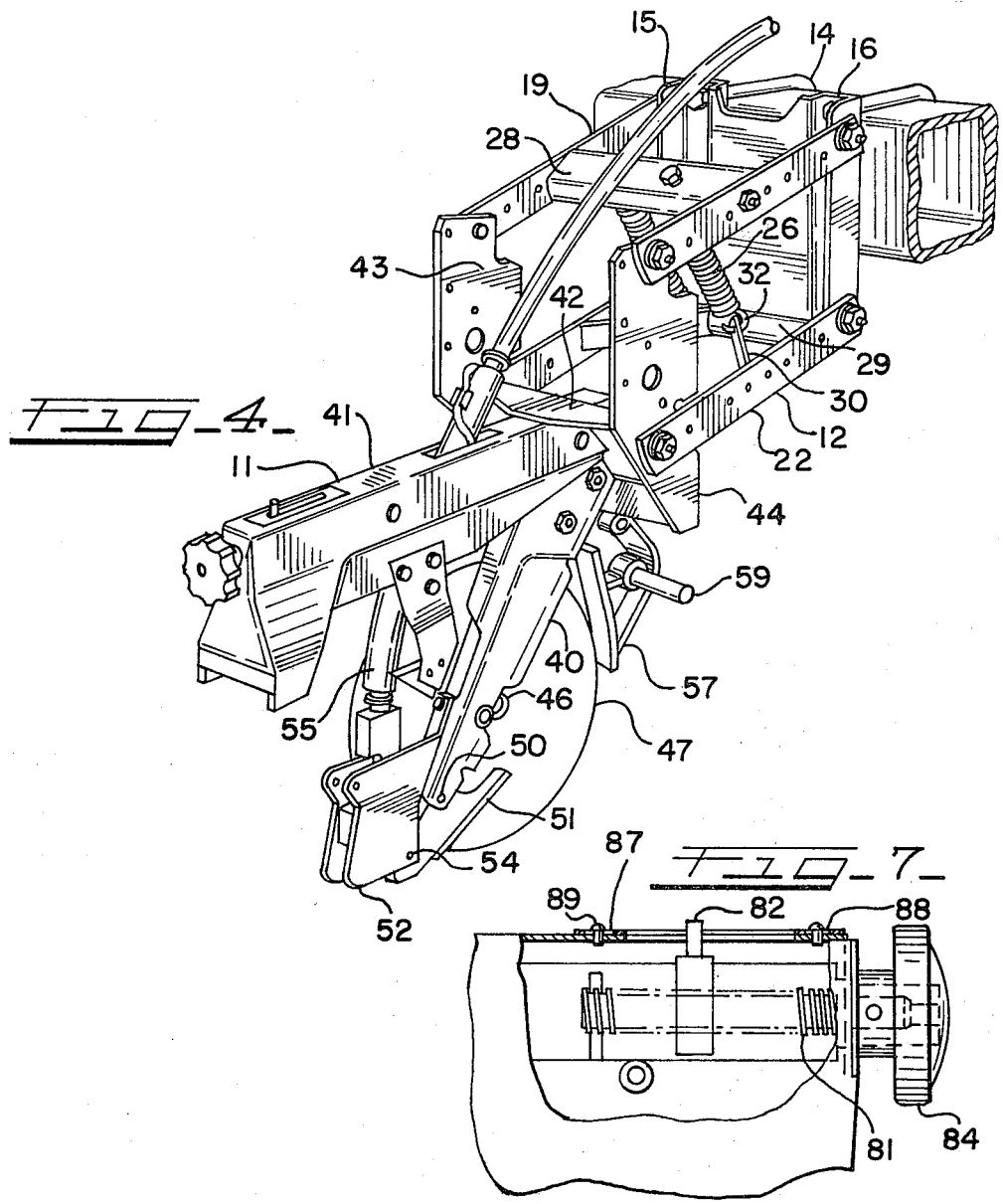
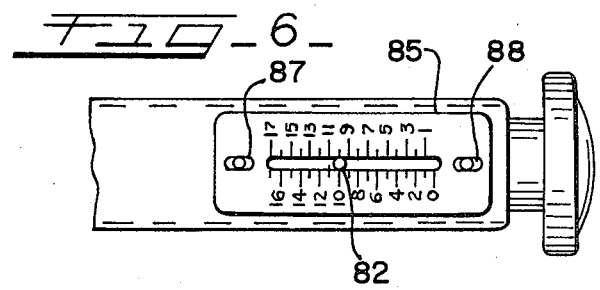

AGRICULTURAL FURROW FORMING APPARATUS DEPTH CONTROL

FIELD OF THE INVENTION

This invention pertains generally to agricultural planting equipment.

DESCRIPTION OF THE PRIOR ART

Furrow depth, and hence planting depth of seeds in a furrow, which is the vertical distance therefrom to the top of the uniform soil covering of the seeds, is critical for successful crop production. Most planters, therefore, utilize furrow forming apparatuses having structure that will provide accurate furrow depth control.

Most commonly each row planter apparatus utilizes dual disk openers mounted on a frame to create a furrow for the seed deposited therein via a seed tube adopted to be connected to a dispenser. A gauge wheel is positioned adjacent but outward each disk with preferably the wheel axis rearward of the disk axis and generally in line where the disk exits the soil. (Various types of structures may be utilized to close the furrow). Each gauge wheel is rotatably mounted on the end of an arm which is itself pivotally mounted on the planter frame. By moving the arms in one direction the gauge wheel positions relative to the frame are changed exposing less of the disks to decrease furrow depth. Movement in a contrary direction increases furrow depth by exposing more of the disks.

The arms may be moved manually until an attached bracket contacts a pin located in a selected hole of a series of holes and no further upward movement is possible when the planter is lowered to the ground. Another type of structure utilizes a lever pivotally mounted on the frame that has an end that contacts both arms, each of which is individually pivotally mounted on the frame. The other end of the lever is mounted for movement in the frame and has structure to engage as desired, a series of fixed holes to provide also incremental depth control and maintain the depth control selected.

While the depth control provided by the structures noted above is adequate, yet problems arise when a series of like planters are mounted at spaced intervals on a transversely extending tool bar. To achieve the proper depth control, seeds are planted and the planting depth is measured and thus a hole is selected until the related furrow depth, which is the elevational distance between the gauge wheel impressions and disks is located. However, utilizing the same hole in an adjacent planter frequently will not achieve the same depth due to planter production tolerances and possibly mounting tolerances due to tool bar deflection. Thus, the same procedure for the other planters must be followed which is time consuming. Of course, if furrow depth is changed, as is frequently necessary due to different seeds being planted or changing soil conditions, this same lengthy procedure must be followed.

SUMMARY OF THE INVENTION

Applicant, as a consequence, designed an apparatus that substantially eliminates the problems detailed above. Generally, Applicant provides structure wherein the furrow depth control can be preferably zeroed in the field while mounted on a tool bar to compensate for manufacturing tolerances, mounting tolerances, and all other variables that affect furrow depth so that the desired set furrow depth of the first apparatus may be likewise set on the other apparatuses, which may or may not require zero setting, (without the digging and seed depth measuring procedures) with all the apparatuses then producing substantially the same furrow depth. This greatly reduces the set up time. Also it is particularly useful when furrow depth changes are made.

Specifically, in an apparatus that supports dual disk openers and has a gauge wheel located adjacent each disk by a support arm pivotally mounted on the apparatus, Applicant provides structure to move the arms via a slide slidably mounted in the apparatus frame that is infinitely movable by a threaded rod via a knob fastened thereto and also has an indicator movable with the thread. A gauge plate is also provided having a zero indication and preferably seventeen equal and numbered divisions that is located adjacent the indicator. The plate has adjustment structure consisting of longitudinally spaced forward and rear slotted holes for movably mounting the plate to the frame by suitable screws.

The procedure to zero set the apparatus in the field if found to be inaccurate for a reason listed above, is to raise the tool bar and thus all apparatuses, turn the depth control knob of the inaccurate apparatus until the indicator has moved rearward toward the zero position and as far as possible. The screws holding the gauge plate are first loosened and the plate moved rearwardly as far as the slots allow. The tool bar is then lowered until the wheels contact a level surface with the disks above the surface. The pivotally mounted furrow forming point if used accommodates to this condition. The control knob is now rotated until the disks contact the level surface along with the wheels. This is the zero furrow depth position so the zero position on the gauge plate is aligned with the indicator and the screws fastening the plate to the frame are tightened. Inasmuch as the slide remains against the arms due to the planter weight when the wheels contact the ground for all changes for increased or decreased furrow depth, the same depth setting is achieved for all like set planters. Thus when planting and thus furrow depth changes are made on one planter, the same depth will be achieved with all other like set planters.

It is, therefore, an object of this invention to provide a new and improved furrow forming apparatus depth control.

Another object is to provide an apparatus that when a furrow depth is zero set, all like set apparatuses having the same control create the same furrow depth.

Another object of this invention is to provide an apparatus depth control that can be zeroed in the field.

BRIEF DESCRIPTION OF THE DRAWINGS

FIG. 1 is a side elevational view of the apparatus of this invention;

FIG. 2 is a view looking rearward before the tool bar showing the apparatus set at zero furrow depth;

FIG. 3 is a sectional view of a gauge wheel and support arm taken along 3—3 of FIG. 1;

FIG. 4 is a perspective right side view primarily of the right disk and scraper with the associated gauge wheel of the apparatus removed;

FIG. 5 is a partial plan view of the apparatus taken along 5—5 of FIG. 1 showing the gauge wheel adjustment;

FIG. 6 is an elongated plan view of the furrow depth indicating adjustment structure; and FIG. 7 is a side view (cut away) of the structure of FIG. 6.

DESCRIPTION OF THE PREFERRED EMBODIMENT

Referring to FIGS. 1, 2 and 4, 10 indicates a furrow forming apparatus for a seed planter. Apparatus 10 has a frame 11. Apparatus 10 includes a mounting means 12 for attachment to a mobile power source such as a tractor or tool bar for towing. Mounting means 12 includes a head bracket 14 having lateral flanges 15 and 16. Bracket 14 has suitable holes for connection thereof to the tool bar by U-bolts and nuts. Dual spaced upper links 19 are pivotally connected to the upper part of flanges 15 and 16 at pivots 20 by suitable fasteners and are similarly connected to frame 11 at 21. Dual spaced lower links 22 are similarly connected between the noted flanges at pivots 24 and the frame at 25. The conventional parallel link arrangement described allows the apparatus to follow the ground contour in operation.

Where the apparatus does not have sufficient weight to create the furrow, dual biasing means 26 are provided. Each means 26 extends between channel 28 attached between upper links 19 and support structure which includes tube 29 rigidly connected between links 22 and braces 30 extending between tube 29 and each link 22. Means 26 includes spring 31 having a hook end 32 which connects with a suitable aperture in brace 30. Bolt 34, top washer 35 and lock nut 37 along with internally threaded plug 38 which is also threaded inside spring 31, connect the spring 31 to the top channel 28. It can be seen that spring adjustment can be provided by loosening lock nut 37 and rotating bolt 34 clockwise which will cause the plug 38 to move thereto, thereby extending spring 31. Due to the connection of spring 31 to the upper links 19 remote from pivot 20, compared to the hook end 32 of spring 31 which is located close to pivot 24, the parallel linkage is spring loaded downwardly to increase the force applied to the opener disks 47 and 48 to ensure that they penetrate the soil. Moving top channel 28 to other holes shown in top links 19 will provide further adjustment.

Frame 11 is a weldment that provides the necessary structure for all elements of the apparatus. As shown best in FIGS. 1 and 4, frame 11 consists of left 39 and right hand 40 lower sheets that provide the support for the later to be described disks, compaction runner, seed shoe (deflector), and gauge wheels. Frame 11 also includes upper channel 41 which is welded to the sheets and which houses the gauge wheel adjustment and spreader plate 42 which primarily provides support for left and right hand plates 43 and 44 on which are mounted pivots 21 and 25 of the parallel bar linkage. Suitable structure in the plates provide stops as desired for the parallel linkage.

Referring also to FIG. 4, support 46 is welded into sheets 39 and 40 and supports furrow forming disks 47 and 48. Preferably the axes of the 14 inch diameter disks are staggered longitudinally by one inch with left disk 47 forward and the axes inclined so that the included angle is 9.5 degrees and the disks substantially contact each other at a point forward of their axes at about 38 degrees downwardly from the horizontal. Flange type bearings are utilized which are rotatably connected to support 46 welded to frame 11 by bolts threaded therein.

Located below support 46 is pin 50 which loosely supports compaction runner 51. Runner 51 also has a lower V-shaped configuration that extends slightly below the disks to provide the desired firmed furrow configuration. Runner 51 is also supported on rearward deflector or shoe 52 via pin 54 with shoe 52 being attached to sheets 39 and 40 by suitable cap screws shown. Shoe 52 is also spaced for seed tube 55 which extends therebetween to drop seed rearward of the V-shaped portion of the runner 51 into a furrow. Shoe 52 also prevents the movement of loose soil into the furrow until the seed has been deposited.

Located forwardly of support 46 and connected between sheets 39 and 40 by suitable fasteners is gauge wheel mounting 57. Mounting 57 has pins 58 and 59 which are staggered longitudinally by one inch as the disks, with pin 58 forward and the pins are threaded into the mounting on axes parallel to the disk axes. As shown best in FIG. 1, mounted on pin 58 is left hand arm or support 60. Arm 60 has a rearwardly extending portion 61 that is connected to gauge wheel assembly 62 and a forwardly extending portion 64. Right hand arm of support 65 is similar to 60, and has rearward portion 66 for gauge wheel assembly 67 (not shown in FIG. 1) but, because of the staggered mounting, has a longer forward upper portion 68 than 64 since they are transversely aligned to contact gauge wheel depth adjustment mechanism 69.

Gauge wheel assembly 62 (see FIG. 3) is typical for both arms 60 and 65 and includes wheel 70 made from composite elements connected by suitable fasteners. Each arm 60 (and 65) is connected to a roller bearing 71 with an integral shaft by pin 72. It is to be noted that the bore for bearing 71 in arm 60 is inclined laterally outwardly and downwardly by about 2.50° from the associated disk, as shown in FIG. 2, so that radially inward, peripheral lip 74 of semi pneumatic tire 75 will substantially contact its disk at an arc of about 8:30 to 4:30 throughout its travel as shown in FIG. 1 in broken lines and create uncompacted mount of loose soil along the furrow wall. This arc extends beyond the point of entry of the disk into the soil and its exit and helps prevent flow of trash between wheel and disk. Primarily it provides a mound of uncompacted soil for deposition into a furrow to provide uniform cover for the seed regardless of soil type in conjunction with the other gauge wheel. The flexing of tire 75 helps prevent the caking of soil thereon.

Gauge wheel adjustment mechanism 69 is shown best in FIGS. 1 and 5. Adjusting mechanism 69 is located in upper channel 41 of frame 11 and is readily accessible from the end of the apparatus remote from the tool bar. Mechanism 69 includes hollow slide 77 located in channel 41 and supported for movement on pins 78 (one shown) extending through channel 41 and slots in slide 77. Slide 77 also has an end 79 extending through a suitable opening through spreader plate 42. End 79 is rigid with the slide and has rod 80 extending transversely therethrough and rigid therewith. Rod 80 extends between the ends of 64 of arm 60 and 68 of arm 65 and forward thereof. Therefore rearward movement of slide 77 will force arms 60 and 65 rearwardly causing the associated wheel assemblies to move toward the soil thereby lifting frame 11 and thus raising the disks to create a shallower furrow. Opposite movement will provide a deeper furrow. The infinite adjustment of movement of slide 77 is caused by a depth adjustment rod 81 having a right hand thread at its rearmost end that is engageable with a complementary internal thread in the rearward end of the slide 77. Indicator 82 is mounted in slide 77. Attached to the end of rod 81 is knob 84. Rotation of knob 84 clockwise will move indicator 82 and slide 77 rearward thus lowering the gauge wheels to create a shallow furrow. The indicator will move toward the zero gauge position shown in FIG. 2. Turning counterclockwise will produce a counter result. A planting range of 0-4" furrow depth is provided. As shown, the indicator indicates an approximate 2 inch planting depth. Suitable detent means can be provided to maintain knob 84 in the set position.

Furrow depth indicating gauge structure 85 (see FIGS. 5, 6 and 7) is movably located on frame 11 adjacent indicator 82 and has a zero indicating position and equally spaced indicia (numbers shown) extending therefrom. Adjustment structure including forward and rearward slotted holes 87 and 88 respectively in structure 85, when utilized with capscrews 89 provide an adjustable mounting of the structure 85 to the frame to provide an accurate depth indication with indicator 82.

Referring to FIG. 1, the gauge wheels are shown in broken lines at the same elevation of the disks at the zero furrow position. FIG. 2 discloses the substantial meeting of the preferably staggered disks and the gauge wheels in the zero position. The solid line position of the gauge wheels in FIG. 1 discloses a two inch planting furrow, while the upper broken line position shows the approximate highest elevation of the gauge wheels which provides approximately a four inch furrow depth. Also to be noted from FIG. 1 is that gauging occurs (with little change) between the maximum depth of the disks (and laterally adjacent the disks) and where the disks exit the soil. The compaction runner provides a consistent V-shaped firmed furrow bottom while the deflector or shoe prevents soil inflow into the furrow and provides support for the seed tube.

In operation, to achieve accurate furrow depth control so that the setting of the furrow depth on one apparatus is the same as others requires that the depth control be zeroed in the field on the tool bar if needed. This is accomplished by raising the tool bar and, hence, inaccurate apparatus, and turning the knob 84 thereof until the indicator 82 has moved rearward toward the zero position and beyond as far as possible. The screws 89 holding the gauge plate 85 are also loosened and the plate 85 moved rearwardly as far as possible. The tool bar is then lowered until the wheels 67 and 62 contact a level surface with disks 47 and 48 above the surface. The knob 84 is now rotated until the disks contact the same surface as the wheels. This is the zero depth position. The plate 85 is now moved until the zero position is opposite indicator 82 and the plate tightened to the frame by the screws 89. Since the planter is now zero set, all zero set planters—when the same furrow depth settings are utilized—will produce furrows of the same depth.

What is claimed is:

1. A furrow forming apparatus depth control for a seed planter, comprising:
    (a) a frame, said frame being adapted to be attached for towing to a mobile power source;
    (b) a pair of opposed furrow forming disks rotatably mounted on said frame, with the disks substantially contacting each other at the approximate point of entry into the soil and diverging apart rearwardly and upwardly relative to the direction of travel;
    (c) a pair of gauge wheel means individually mounted on said frame forward of said disks for regulating furrow depth, each means including a support pivotally mounted on said frame, a wheel located generally adjacent an outer surface of a disk and rotatably mounted on said support;
    (d) gauge wheel adjustment means movably mounted on said frame for contact with said supports to achieve desired furrow depth, said means including an indicator and a slide slideably mounted on said frame forward of said supports and above the pivotal mounting of said supports on said frame, said slide having a threaded portion and including structure positioned adjacent said supports and extending transversely thereto and to the furrow, a threaded rod engageable with said threaded portion and a knob for rotating said rod for moving said supports equally in the same direction;
    (e) furrow depth indicating means having a zero indicating position and spaced indicia located adjacent said indicator; and
    (f) adjustment means for selectively mounting said indicating means on said frame, said adjustment means including a longitudinally spaced pair of slotted holes elongated in the direction of indicator travel in said indicating means and complementary fasteners to selectively secure said indicating means to said frame, whereby with said disks and wheels in contact with a level surface, and said zero indicating position of said indicating means being located opposite said indicator by said adjustment means and secured to said frame, accurate depth control is achieved.

* * * * *